United States Patent
Lian et al.

(10) Patent No.: US 7,990,699 B2
(45) Date of Patent: Aug. 2, 2011

(54) HEAT DISSIPATION DEVICE FOR MEMORY MODULE

(75) Inventors: Zhi-Sheng Lian, Shenzhen (CN);
Gen-Ping Deng, Shenzhen (CN);
Chun-Chi Chen, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 58 days.

(21) Appl. No.: 12/537,265

(22) Filed: Aug. 7, 2009

(65) Prior Publication Data

US 2010/0172088 A1    Jul. 8, 2010

(30) Foreign Application Priority Data

Jan. 8, 2009   (CN) .......................... 2009 1 0300120

(51) Int. Cl.
*H05K 7/20* (2006.01)
(52) U.S. Cl. .............. 361/679.47; 361/679.52; 361/704; 361/719; 361/700; 165/104.21; 165/104.26; 165/104.33; 165/185
(58) Field of Classification Search ............. 361/679.46, 361/679.47, 679.31, 679.52, 700–712, 715–724; 165/80.2, 80.3, 80.4, 80.5, 104.26, 104.33, 165/104.34, 185; 174/15.1, 16.3, 252; 257/706–727
See application file for complete search history.

(56) References Cited

U.S. PATENT DOCUMENTS

| | | | | |
|---|---|---|---|---|
| 6,025,992 A * | 2/2000 | Dodge et al. | .................. | 361/704 |
| 6,496,375 B2 * | 12/2002 | Patel et al. | ..................... | 361/719 |
| 6,937,474 B2 * | 8/2005 | Lee | ............... | 361/715 |
| 7,106,595 B2 * | 9/2006 | Foster et al. | .................. | 361/721 |
| 7,151,668 B1 * | 12/2006 | Stathakis | ...................... | 361/700 |
| 7,187,552 B1 * | 3/2007 | Stewart et al. | ................ | 361/704 |
| 7,345,882 B2 * | 3/2008 | Lee et al. | ...................... | 361/710 |
| 7,349,220 B2 * | 3/2008 | Lai et al. | ........................ | 361/719 |
| 7,372,702 B2 * | 5/2008 | Gauche et al. | ................ | 361/719 |
| 7,391,613 B2 * | 6/2008 | Lai et al. | ....................... | 361/700 |
| 7,612,992 B2 * | 11/2009 | Chen | .................... | 361/679.31 |
| 7,626,823 B2 * | 12/2009 | Yang et al. | .................... | 361/719 |
| 7,755,897 B2 * | 7/2010 | Chen et al. | .................... | 361/707 |
| 2004/0250989 A1 * | 12/2004 | Im et al. | ....................... | 165/80.1 |
| 2008/0264613 A1 * | 10/2008 | Chu | .................... | 165/104.33 |
| 2008/0291630 A1 * | 11/2008 | Monh et al. | ................... | 361/700 |
| 2009/0168356 A1 * | 7/2009 | Chen et al. | .................... | 361/709 |
| 2010/0025010 A1 * | 2/2010 | Cipolla et al. | .................. | 165/47 |
| 2010/0188809 A1 * | 7/2010 | Hsu et al. | ................. | 361/679.47 |
| 2010/0188811 A1 * | 7/2010 | Liang | ....................... | 361/679.52 |

* cited by examiner

*Primary Examiner* — Michael V Datskovskiy
(74) *Attorney, Agent, or Firm* — Frank R. Niranjan

(57) ABSTRACT

A heat dissipation device configured for dissipating heat of a memory module includes two fin assemblies pivotally assembled together through a pivot, two heat spreaders adapted for being arranged at two opposite side surfaces of the memory module, and two heat pipes. Each of the two heat pipes includes an evaporation section and a condensation section formed at two opposite ends thereof. The condensation sections of the heat pipes are respectively attached to the fin assemblies, and the evaporation sections of the heat pipes are respectively and thermally attached to the heat spreaders, whereby the heat of the memory module is transferred by the heat pipes from the heat spreaders to the fin assemblies for dissipation.

18 Claims, 6 Drawing Sheets

HEAT DISSIPATION DEVICE FOR MEMORY MODULE

BACKGROUND

1. Technical Field

The present disclosure relates to heat dissipation devices, and more particularly to a heat dissipation device which can be conveniently fixed to a memory module for efficiently dissipating heat generated by memory chips on the memory module.

2. Description of Related Art

Nowadays, memory modules such as random-access memory (RAM) modules are widely used in computers to improve performances of the computers. The memory module includes a circuit board and a plurality of memory chips mounted on two opposite side surfaces thereof. With continuing development of the electronic technology, the memory chips of the memory modules trend to high integration, and thus generate a large amount of heat required to be dissipated immediately. Therefore, heat dissipation devices are widely used to dissipate the heat generated by the memory modules.

A typical heat dissipation device for using with the memory module includes a top wall and two side walls extending downwardly from two opposite lateral sides of the top wall. A gap is formed between the two side walls for receiving the memory module therein. The gap between the two side walls at a free state is smaller than a thickness of the memory module. In assembly, a tool is needed to enlarge the gap between the two side walls to enable the memory module inserted into the gap. When the tool is removed, the memory module is snappingly sandwiched between the side walls with the memory chips thermally attached to the side walls. Thus, an assembly process of the heat dissipation device is inconvenient.

Furthermore, the heat dissipation device dissipates heat via the top wall and the two side walls. The heat exchange area of the top wall and the two side walls is so small that the heat dissipation device has a low heat dissipation efficiency.

For the foregoing reasons, a heat dissipation device which can overcome the above described shortcomings is desired.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
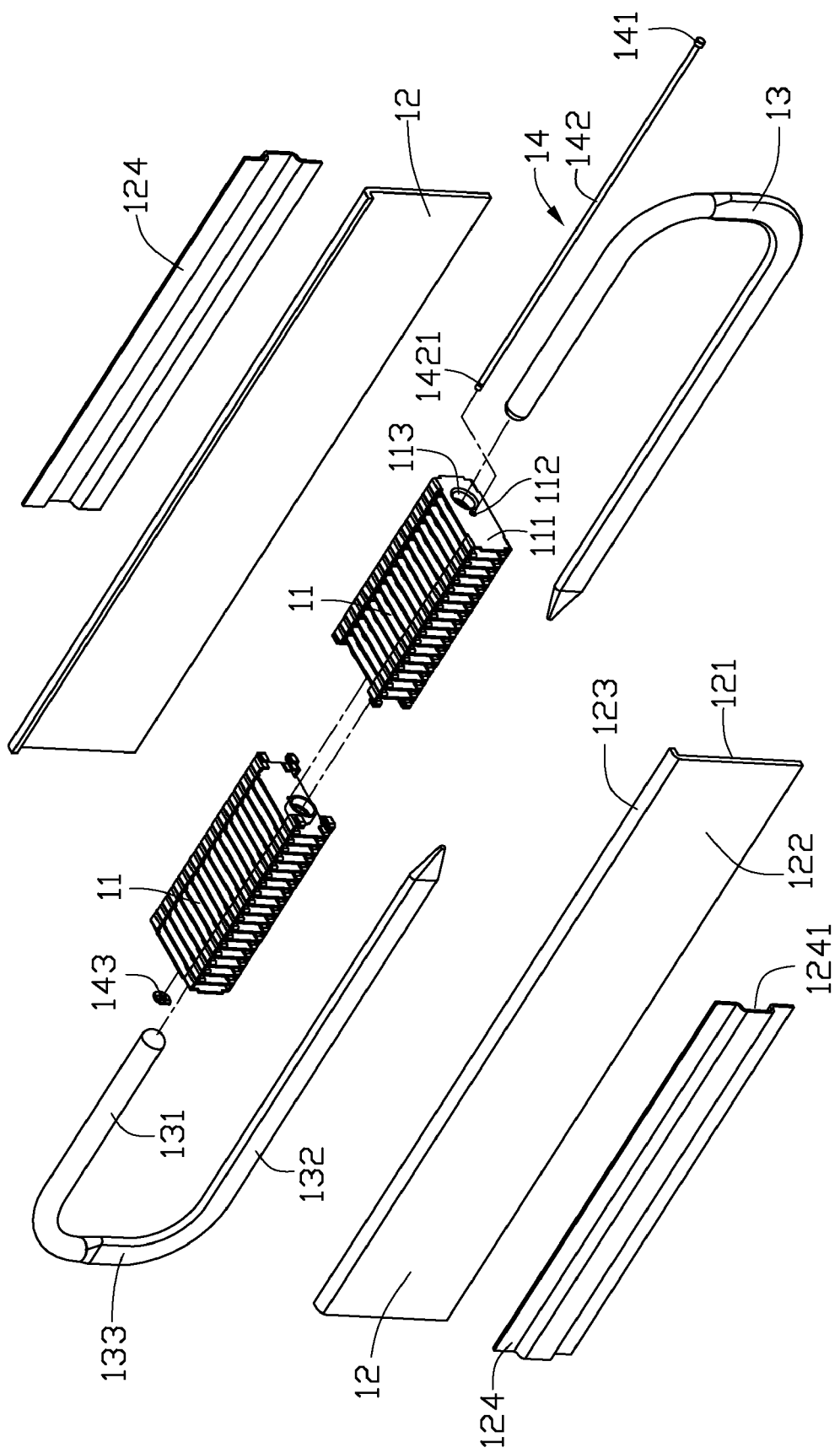
FIG. 1 is an exploded, isometric view of a heat dissipation device according to a first embodiment of the present disclosure.
Figure 2:
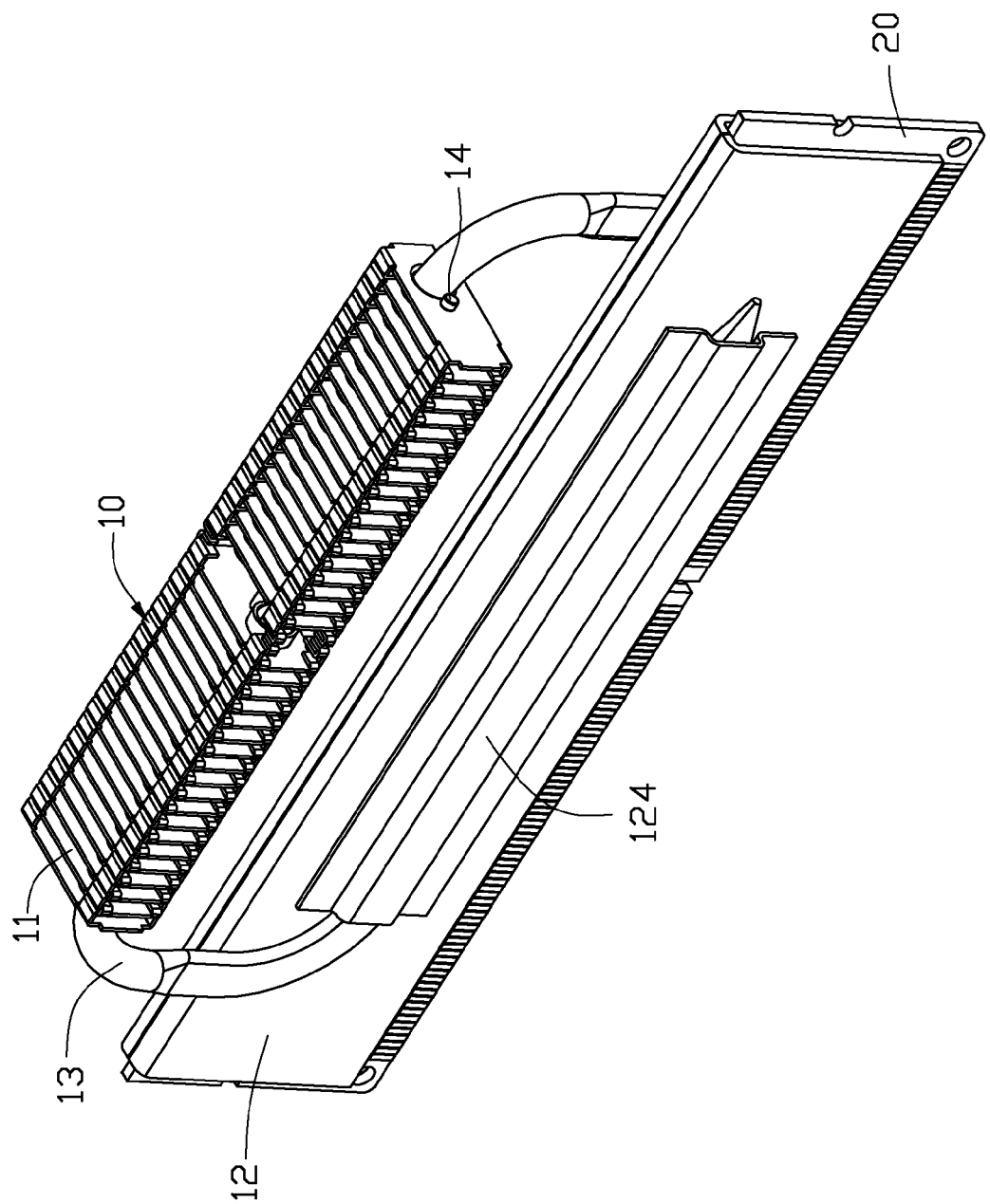
FIG. 2 is an assembled, isometric view of the heat dissipation device of FIG. 1, wherein the heat dissipation device is assembled on a memory module.

Referring to FIGS. 1 and 2, a heat dissipation device 10 according to a first embodiment of the present invention is shown. The heat dissipation device 10 is used for cooling a memory module 20, such as a random-access memory (RAM) module. The memory module 20 has a plurality of memory chips 21 (referring to FIG. 3) mounted on two opposite side surfaces 22 thereof.

The heat dissipation device 10 includes two fin assemblies 11, two heat spreaders 12 spaced from the two fin assemblies 11, two heat pipes 13 respectively connecting the two fin assemblies 11 with the two heat spreaders 12, and a pivot 14 pivotally extending through the two fin assemblies 11.

Each of the two fin assemblies 11 includes a plurality of fins 111 stacked together. Each of the fins 111 defines an axle hole 112 in a middle portion thereof and a through hole 113 near the axle hole 112 thereof. As particularly shown in FIG. 1 of the illustrated embodiment, the through hole 113 of the fin 111 of one of the two fin assemblies 11 is located at a left lateral side of the axle hole 112 of the fin 111. The through hole 113 of the fin 111 of the other one of the two fin assemblies 11 is located at a right lateral side of the axle hole 112 of the fin 111. The two fin assemblies 11 are arranged end-to-end in a line with the axle holes 112 of the fins 111 aligning with each other for receiving the pivot 14. The two fin assemblies 11 are spaced from each other. Each of the fin assemblies 11 can rotate about the pivot 14.

Each of the heat pipes 13 is substantially U-shaped. The heat pipe 13 includes a condensation section 131 formed at one end thereof, an evaporation section 132 formed at the other end thereof, and a connecting section 133 connected between the condensation section 131 and the evaporation section 132. The condensation section 131 is spaced from and parallel to the evaporation section 132 of the heat pipe 13. The condensation section 131 is round and shorter than the evaporation section 132. The through holes 113 of each of the fin assemblies 11 align with each other for receiving the condensation section 131 of one of the heat pipes 13. The condensation sections 131 of the heat pipes 13 respectively extend into the through holes 113 of the fin assemblies 11 from two confronting directions. The condensation sections 131 of the heat pipes 13 are parallel to the pivot 14. The evaporation section 132 is substantially flat. The evaporation sections 132 of the heat pipes 13 are parallel to each other and positioned below the fin assemblies 11. Each of the evaporation sections 132 is attached to one of the heat spreaders 12.

The two heat spreaders 12 are spaced from each other. Each of the heat spreaders 12 is a metal plate and includes an inner surface 121 and an outer surface 122 opposite to the inner surface 121. A top side of each of the heat spreaders 12 which is located adjacent to the fin assemblies 11 is bent towards its inner surface 121 to form a flange 123. The evaporation section 132 of each of the heat pipes 13 is secured to a corresponding heat spreader 12 by a securing plate 124 which is mounted on a middle portion of the outer surface 122 of the heat spreader 12. The securing plate 124 defines a securing slot 1241 in a middle portion thereof. The securing slot 1241 has a same shape as that of the evaporation section 132 of the heat pipe 13 and is opened in a direction toward the outer surface 122 of the corresponding heat spreader 12. The evaporation section 132 of the heat pipe 13 is received in the securing slot 1241 and attached to the outer surface 122 of the corresponding heat spreader 12 by the securing plate 124.

The pivot 14 includes a head 141, a pole portion 142 extending straight from the head 141, and a retaining ring 143 coiled around a free end of the pole portion 142. An outer diameter of the head 141 is larger than that of the pole portion 142. The pole portion 142 defines an annular notch 1421 at the free end thereof. The annular notch 1421 is formed around an outer surface of the pole portion 142. When the pole portion 142 of the pivot 14 extends into the axle holes 112 of the two fin assemblies 11, the retaining ring 143 is engaged in the annular notch 1421 of the pole portion 142 to prevent the fin assemblies 11 from slipping off the pole portion 142.

Figure 3:
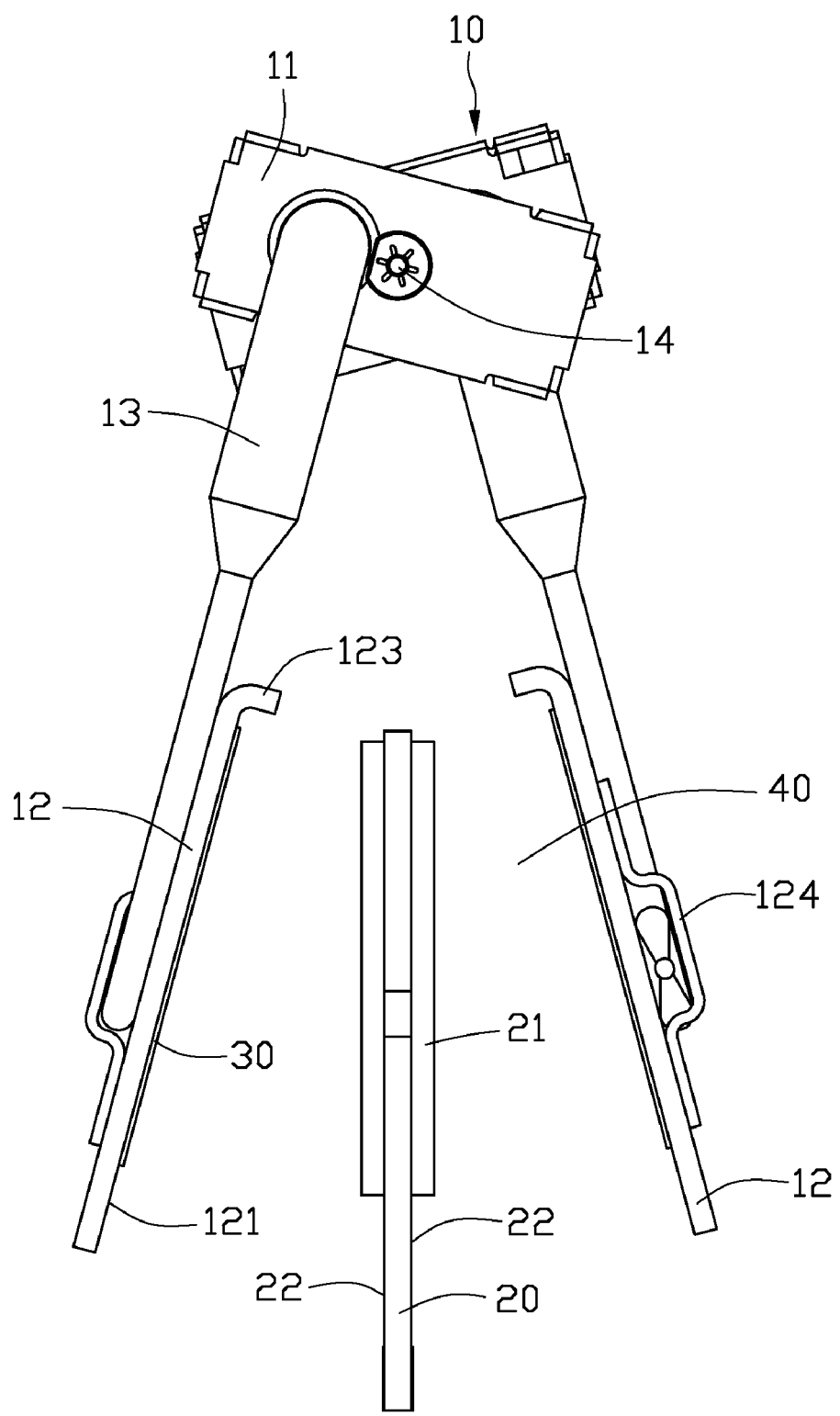
FIG. 3 is a side view of the heat dissipation device of FIG. 1 in a pre-assembly state.
Figure 4:
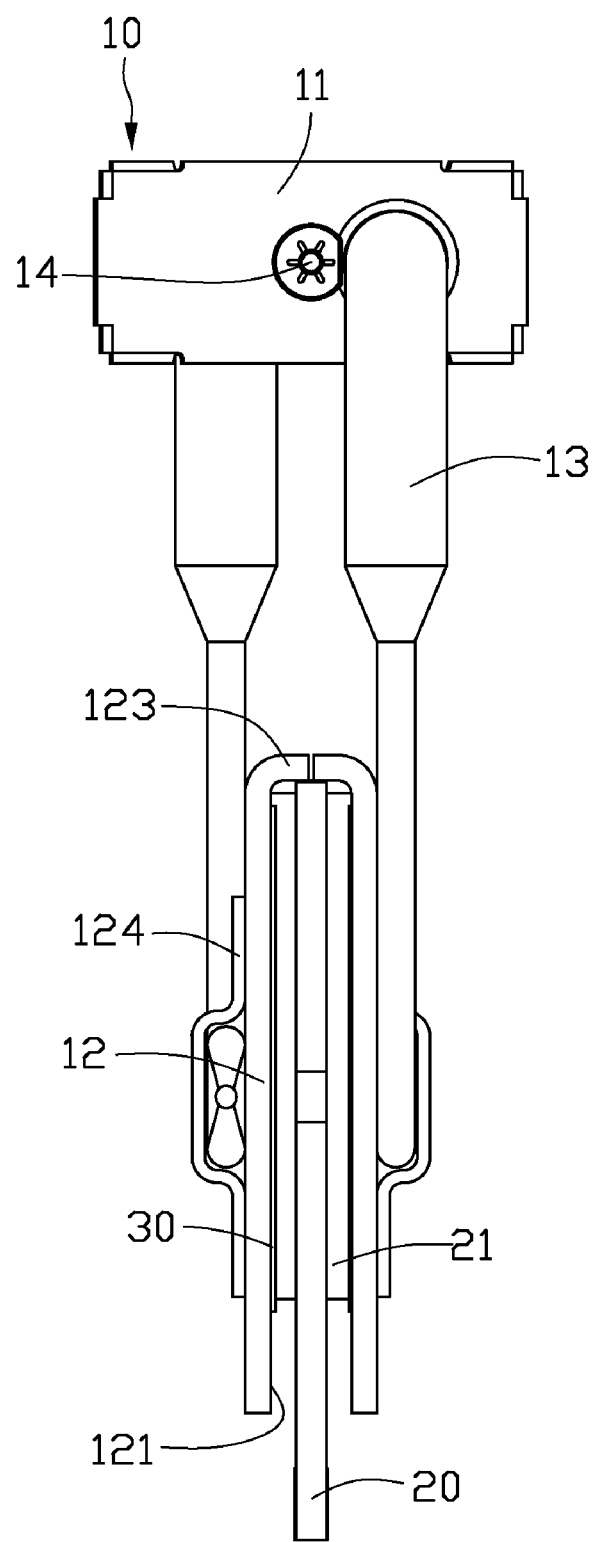
FIG. 4 is a side view of the heat dissipation device of FIG. 1 being assembled on the memory module.

Referring to FIGS. 3 and 4, in assembling the heat dissipation device 10 onto the memory module 20, a layer of thermal interface material 30, such as thermal grease, is firstly spread on the inner surface 121 of each of the heat spreaders 12. One of the two fin assemblies 11 is rotated around the pivot 14 clockwise, and the other one of the two fin assemblies 11 is rotated around the pivot 14 counter-clockwise, to increase a width of a gap 40 defined between the two heat spreaders 12. The inner surfaces 121 of the heat spreaders 12 are respectively aligned with the memory chips 21 mounted on the two opposite side surfaces 22 of the memory module 20. Then, the fin assemblies 11 are rotated around the pivot 14 back to their original states to decrease the width of the gap 40 between the heat spreaders 12 until the memory module 20 is firmly clamped by the two heat spreaders 12. Thus, the heat dissipation device 10 is conveniently assembled on the memory module 20. At this time, the memory chips 21 of the memory module 20 are thermally attached to the inner surfaces 121 of the heat spreaders 12 through the thermal interface materials 30. A top edge of the memory module 20 abuts against the flanges 123 of the heat spreaders 12. The fin assemblies 11 are positioned above the top edge of the memory module 20.

During operation, heat generated by the memory chips 21 is transferred to the evaporation sections 132 through the thermal interface materials 30 and the heat spreaders 12. Working liquid in the evaporation section 132 of the heat pipe 13 absorbs the heat and evaporates into vapor. The vapor condenses in the condensation section 131 and releases the heat to the fin assemblies 11 and finally to the ambient environment. Thus, the heat of the memory module 20 is efficiently transferred and dissipated via the heat dissipation device 10.

Figure 5:
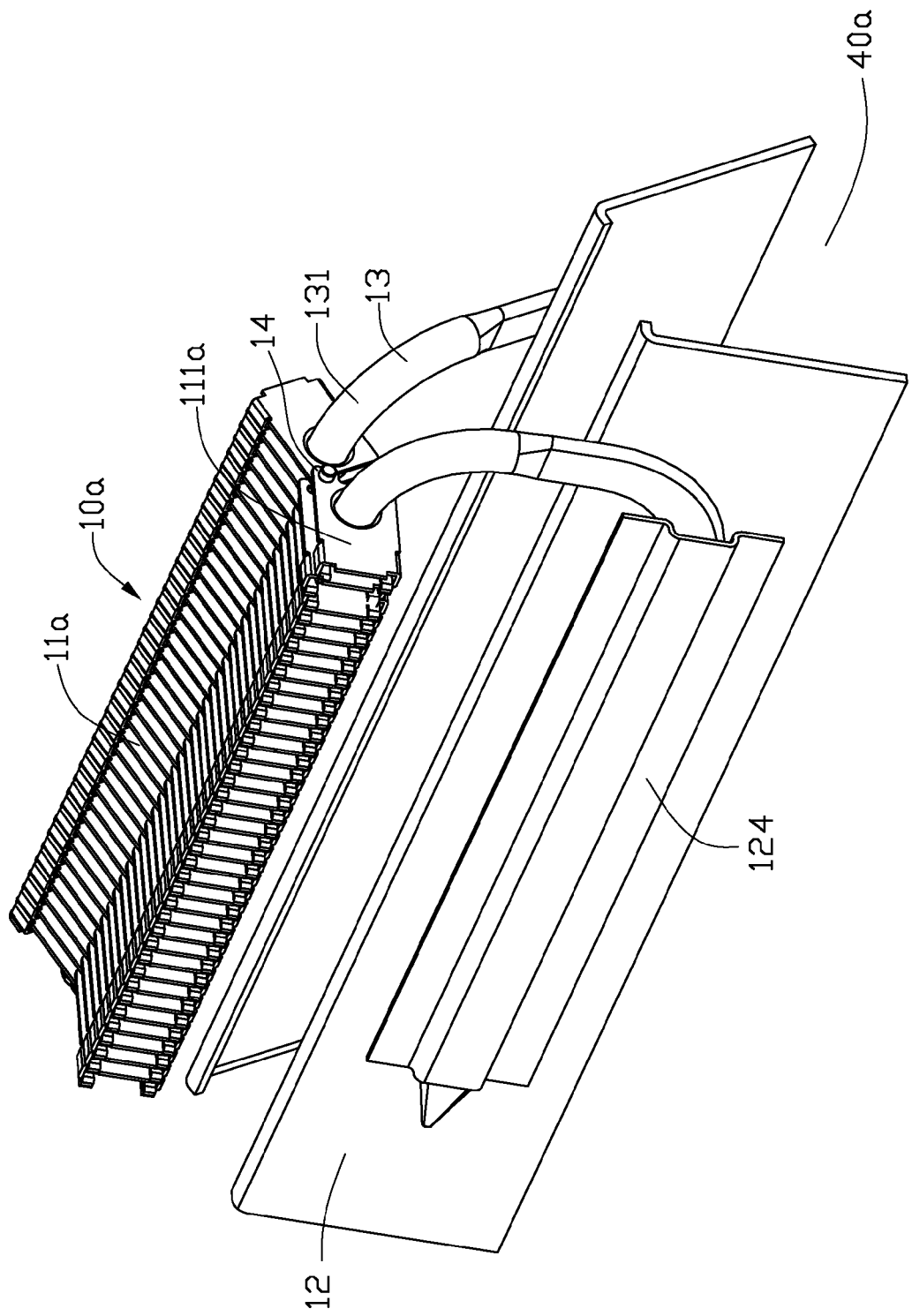
FIG. 5 is an assembled, isometric view of a heat dissipation device according to a second embodiment of the present disclosure.
Figure 6:
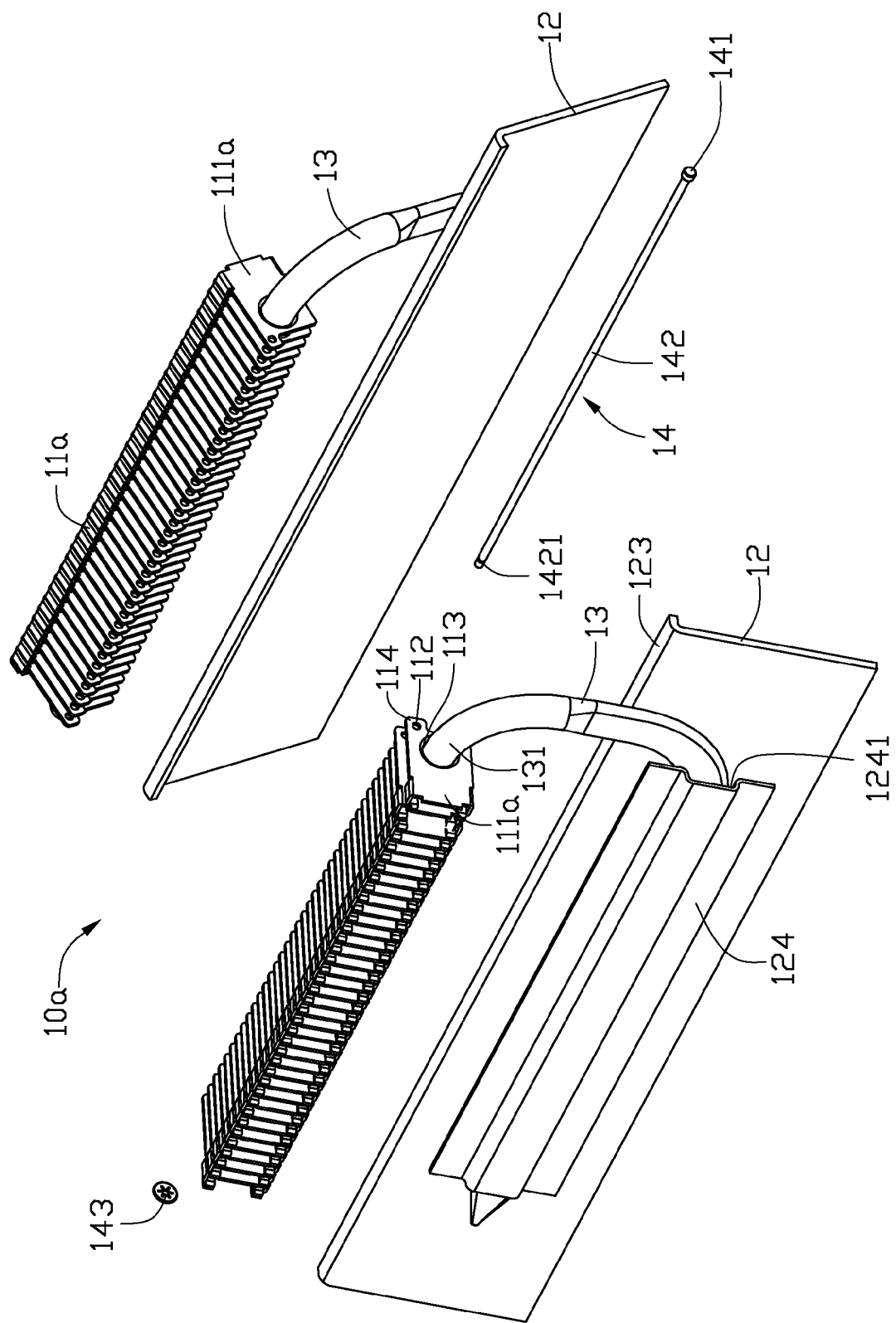
FIG. 6 is an exploded, isometric view of the heat dissipation device of FIG. 5.

FIGS. 5 and 6 show a heat dissipation device 10a according to a second embodiment of the present disclosure. The heat dissipation device 10a is similar to the previous embodiment. The difference is in that the fin assemblies 11a of the heat dissipation device 10a are disposed side-by-side, and the condensation sections 131 of the heat pipes 13 extend respectively into the two fin assemblies 11a from a same direction. Each of the fin assemblies 11a includes a plurality of fins 111a. Each of the fins 111a has an ear 114 formed on a corner thereof. Each of the fins 111a defines a through hole 113 in a middle portion thereof and an axle hole 112 in the ear 114. The fins 111a of one of the fin assemblies 11a are staggered with respect to the fins 111a of the other one of the fin assemblies 11a, with the ear 114 of each fin 111a of the one of the fin assemblies 11a inserted into a space defined between two adjacent fins 111a of the other one of the fin assemblies 11a. The axle holes 112 of the fin assemblies 11a are aligned with each other. The pivot 14 extends through the axle holes 112 to assemble the fin assemblies 11a together. The through holes 113 of each of the fin assemblies 11a align with each other for receiving the condensation section 131 of one of the heat pipes 13. The condensation sections 131 of the heat pipes 13 are parallel to the pivot 14. When the heat dissipation device 10a is assembled onto the memory module 20, one of the fin assemblies 11 is rotated around the pivot 14 clockwise, and the other one of the two fin assemblies 11 is rotated around the pivot 14 counter-clockwise, to increase a width of a gap 40a defined between the two heat spreaders 12, so that the heat dissipation device 10a can be easily assembled onto the memory module 20.

It is to be understood that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat dissipation device being configured for dissipating heat of a memory module, the heat dissipation device comprising:
    two fin assemblies, each of the fin assemblies comprising a plurality of fins, each of the fins defining an axle hole, the axle holes of the fin assemblies aligning with each other and receiving a pivot therethrough, the fin assemblies thereby pivotally assembled together through the pivot;
    two heat spreaders adapted for being arranged at two opposite side surfaces of the memory module to absorb heat generated by memory chips of the memory module; and
    two heat pipes each comprising an evaporation section and a condensation section formed at two opposite ends thereof, the condensation sections of the heat pipes being respectively attached to the fin assemblies, the evaporation sections of the heat pipes being respectively and thermally attached to the heat spreaders, whereby the heat of the memory module is transferred by the heat pipes from the heat spreaders to the fin assemblies for dissipation when the heat dissipation device is configured to the memory module.

2. The heat dissipation device of claim 1, wherein each of the fins defines a through hole, the through holes of the fins of each of the fin assemblies aligning with each other for receiving the condensation section of a corresponding one of the heat pipes.

3. The heat dissipation device of claim 2, wherein each of the heat pipes is substantially U-shaped, the condensation section and the evaporation section of each of the heat pipes being parallel to each other, the condensation section being round and the evaporation section being flat.

4. The heat dissipation device of claim 2, wherein the fin assemblies are arranged end-to-end in a line, the condensation section of each heat pipe being shorter than the evaporation section of each heat pipe, the condensation sections of the heat pipes respectively extending into the fin assemblies from two confronting directions.

5. The heat dissipation device of claim 4, wherein the axle hole is defined in a middle portion of each of the fins, the through hole of each of the fins of one of the fin assemblies is located at a left lateral side of the axle hole of the fin, and the through hole of each of the fins of the other one of the fin assemblies is located at a right lateral side of the axle hole of the fin.

6. The heat dissipation device of claim 2, wherein the fin assemblies are arranged side-by-side, the condensation sections of the heat pipes respectively extending into the fin assemblies from a same direction.

7. The heat dissipation device of claim 2, wherein the fin assemblies are arranged side-by-side, and each of the fins of the fin assemblies has an ear formed thereon, the axle hole being defined in the ear, the through hole being defined in a middle portion of each of the fins, the fins of one of the fin assemblies being staggered with respect to the fins of the other one of the fin assemblies, and the ear of each of the fins of the one of the fin assemblies being inserted into a space defined between two adjacent fins of the other one of the fin assemblies.

8. The heat dissipation device of claim 1, wherein the pivot comprises a head, a pole portion extending straight from the head, and a retaining ring coiled around a free end of the pole portion, the pole portion defining an annular notch at the free end thereof, the annular notch being formed around an outer surface of the pole portion, and the retaining ring being engaged in the annular notch.

9. The heat dissipation device of claim 1, wherein each of the heat spreaders comprises an inner surface and an outer surface opposite to the inner surface, the evaporation sections of the heat pipes being respectively secured on the outer surfaces of the heat spreaders, and the inner surfaces of the heat spreaders being thermally attached to two opposite side surfaces of the memory module, respectively, when the heat dissipation device is configured to the memory module.

10. The heat dissipation device of claim 9, wherein each of the heat spreaders is provided with a securing plate mounted on a middle portion of the outer surface thereof, the securing plate defining a securing slot in a middle portion thereof, the securing slot having a same shape as that of the evaporation section of the heat pipe and being open in a direction toward the outer surface of a corresponding heat spreader, and the condensation section of the heat pipe being received in the securing slot.

11. The heat dissipation of claim 9, wherein a top side of each of the heat spreaders which is located adjacent to the fin assemblies is bent towards the inner surface of the heat spreader to form a flange.

12. A combination comprising:
a memory module;
two fin assemblies, each of the fin assemblies comprising a plurality of fins, each of the fins defining an axle hole and a through hole, the axle holes of the fin assemblies being aligned with each other and receiving a pivot therethrough, the fin assemblies thereby pivotally assembled together through the pivot;
two heat spreaders respectively and thermally attached to two opposite side surfaces of the memory module with the memory module being sandwiched between the two heat spreaders; and
two heat pipes each comprising an evaporation section and a condensation section formed at two opposite ends thereof, the condensation sections of the heat pipes being respectively attached to the fin assemblies, the evaporation sections of the heat pipes being respectively attached to the heat spreaders, the fin assemblies being supported by the heat pipes and positioned above a top edge of the memory module;
wherein the through holes of the fins of each of the fin assemblies are aligned with each other and receive the condensation section of a corresponding one of the heat pipes.

13. The combination of claim 12, wherein the heat pipes are U-shaped.

14. The combination of claim 12, wherein the fin assemblies are arranged end-to-end in a line, and the condensation sections of the heat pipes respectively extend into the fin assemblies from two confronting directions.

15. The combination of claim 14, wherein the axle hole is defined in a middle portion of each of the fins, the through hole of each of the fins of one of the fin assemblies being located at a left lateral side of the axle hole of the fin, and the through hole of each of the fins of the other one of the fin assemblies being located at a right lateral side of the axle hole of the fin.

16. The combination of claim 12, wherein the fin assemblies are arranged side-by-side, and each of the fins of the fin assemblies has an ear formed thereon, the axle hole being defined in the ear, the through hole being defined in a middle portion of each of the fins, the fins of one of the fin assemblies being staggered with respect to the fins of the other one of the fin assemblies, the ear of each of the fins of the one of the fin assemblies being inserted into a space defined between two adjacent fins of the other one of the fin assemblies.

17. A heat dissipation device configured for dissipating heat of a memory module, the heat dissipation device comprising:
two fin assemblies pivotally assembled together through a pivot;
two heat spreaders adapted for being arranged at two opposite side surfaces of the memory module to absorb heat generated by memory chips of the memory module; and
two heat pipes each comprising an evaporation section and a condensation section formed at two opposite ends thereof, the condensation sections of the heat pipes being respectively attached to the fin assemblies, the evaporation sections of the heat pipes being respectively and thermally attached to the heat spreaders, whereby a path for transferring the heat of the memory module is provided from the heat spreaders to the heat pipes and thence to the fin assemblies for dissipation of the heat;
wherein each of the heat spreaders comprises an inner surface and an outer surface opposite to the inner surface, the evaporation sections of the heat pipes being respectively secured on the outer surfaces of the heat spreaders, the inner surfaces of the heat spreaders adapted for being thermally attached to the two opposite side surfaces of the memory module, respectively.

18. The heat dissipation device of claim 17, wherein each of the fin assemblies comprises a plurality of fins, and each of the fins defines an axle hole, the axle holes of the fin assemblies aligning with each other and receiving the pivot therethrough.

* * * * *